(12) United States Patent
Taylor et al.

(10) Patent No.: US 6,894,823 B2
(45) Date of Patent: May 17, 2005

(54) MAGNETICALLY ACTUATED MICROELECTROMECHANICAL DEVICES AND METHOD OF MANUFACTURE

(75) Inventors: William Patrick Taylor, North Andover, MA (US); Jonathan Jay Bernstein, Medfield, MA (US)

(73) Assignee: Corning Intellisense LLC, Wilmington, MA (US)

( * ) Notice: Subject to any disclaimer, the term of this patent is extended or adjusted under 35 U.S.C. 154(b) by 203 days.

(21) Appl. No.: 10/133,111

(22) Filed: Apr. 26, 2002

(65) Prior Publication Data

US 2003/0202234 A1 Oct. 30, 2003

(51) Int. Cl.$^7$ .......................... G02B 26/00; G02B 7/182
(52) U.S. Cl. ....................................... 359/291; 359/198
(58) Field of Search ................................ 359/291, 214, 359/224, 198; 324/97; 438/52; 310/36

(56) References Cited

U.S. PATENT DOCUMENTS

| | | | | |
|---|---|---|---|---|
| 5,606,447 A | * | 2/1997 | Asada et al. ................. | 359/199 |
| 5,767,666 A | * | 6/1998 | Asada et al. .................. | 324/97 |
| 5,847,631 A | * | 12/1998 | Taylor et al. .................. | 335/78 |
| 5,912,608 A | * | 6/1999 | Asada ......................... | 335/222 |
| 5,966,009 A | * | 10/1999 | Asada .......................... | 324/97 |
| 6,281,560 B1 | * | 8/2001 | Allen et al. .................. | 257/414 |
| 2001/0022682 A1 | * | 9/2001 | McClelland et al. ........ | 359/280 |

OTHER PUBLICATIONS

Lagorce, Laure K., and Allen, Mark G., Micromachined Polymer Magnets, Georgia Institute of Technology, 1996.*
Park, Jae Y., Lagorce, Laure K., and Allen, Mark G., Ferrite–Based Integrated Planar Inductors and Transformers Fabricated at Low Temperature, Georgia Institute of Technology, 1997.*
Lagorce, Laure K., and Allen, Mark G., Magnetic and Mechanical Properties of Micromachined Strontium Ferrite/Polyimide Composites, 1997.*
Lagorce, Laure K., and Allen, Mark G., Magnetic Microactuators Based on Polymer Magnets, 1999.*

* cited by examiner

Primary Examiner—Scott J. Sugarman
Assistant Examiner—Richard Hanig
(74) Attorney, Agent, or Firm—Wilmer Cutler Pickering Hale and Dorr LLP

(57) ABSTRACT

One embodiment is directed to a mirror device (for a device such as an optical switch, scanner or projector) having a movable mirror structure with an attached magnet. The mirror structure is movably mounted on a base structure, which includes an actuation coil for controlling movement of the mirror structure. Another embodiment is directed to a mirror device (in a device such as an optical switch, scanner or projector) having a high mirror fill factor. The device includes a mirror mounted on a support member, which is connected to a gimbal frame. The support member includes an enlarged portion configured to at least partially extend over the gimbal frame. The mirror substantially covers the enlarged portion of the support member, thereby providing the device with a high mirror fill factor. A further embodiment is directed to a mirror support structure for a movable mirror device (in a device such as an optical switch, scanner or projector). The mirror support structure includes a post member and an enlarged lid member, one of which includes a plurality of holes and the other of which includes a corresponding plurality of projections. The post and lid members are assembled by positioning the projections in the corresponding holes.

117 Claims, 10 Drawing Sheets

MAGNETICALLY ACTUATED MICROELECTROMECHANICAL DEVICES AND METHOD OF MANUFACTURE

BACKGROUND OF THE INVENTION

1. Field of the Invention

The present invention relates generally to microelectromechanical (MEMS) devices and, in particular, to arrayed magnetically actuated MEMS devices such as arrayed mirrors used in optical switches and other devices like scanners and projectors.

2. Description of Related Art

FIG. 1 schematically illustrates an example of an optical cross-connect 12 of an optical switch. The cross-connect 12 includes an array of collimators or other beam-forming devices, represented by grid 14, and forms incoming optical communications signals into beams that impinge on an array of selectively moveable reflectors or mirrors represented by grid 16. Each beam from grid 14 has its own corresponding moveable mirror on grid 16.

The moveable mirrors of grid 16 are controllably positioned so as to individually direct the respective beams from grid 14 to respective moveable mirrors of a second array of moveable mirrors, represented by grid 18. The moveable mirrors of grid 18 are positioned so as to individually direct the beams received from grid 16 to respective beam receivers of an array of beam receivers represented by grid 20. The beam receivers may take various forms, such as transducers, lenses or optical elements for coupling the respective beams into respective optical fibers, waveguides, or the like. As with grids 14 and 16, each moveable mirror of grid 18 is associated with a particular beam receiver of grid 20, so that each receiver receives beams on a single axis. A representative signal path from grid 14 to grid 20 is indicated by arrow 22.

Attempts have been made previously to fabricate arrays of mirrors such as those represented by grids 16 and 18 using MEMS technology, in which silicon processing and related techniques common to the semiconductor industry are used to form microelectromechanical devices. For switches such as those shown in FIG. 1, it is desirable to have an array of moveable mirrors that are both densely packed and easily controlled.

As is known in the art, movable mirrors can be actuated or controlled in a variety of ways including through electromagnet actuation, electrostatic actuation, piezoelectric actuation, stepper motors, thermal bimorph and comb-drive actuation.

FIGS. 2A and 2B illustrate an electromagnetically actuated single-mirror device 30 in accordance with the prior art. The device 30 includes a mirror structure 32 movably supported on a gimbal structure, which comprises inner and outer gimbal frames 34, 35. The mirror structure 32 includes a mirror having a reflective surface 33, which is on the same side of the mirror structure as an actuation coil 36.

Two actuation coils are provided: the inner coil 36 on the mirror structure 32, and an outer coil 38 on the inner gimbal frame 34. An external magnetic field B oriented at 45 degrees to the X and Y axes provides torque when either the inner or outer coils are actuated with current, thereby causing the mirror structure 32 to rotate about respective torsional hinges or flexures 40, 41 as desired.

The actuation coil 36 on the mirror structure 32 requires space and reduces the area available for the reflective surface area of the mirror. (Consequently, the mirror area fill factor of the device, which is the ratio of the area of the exposed reflective surface 33 of the mirror relative to the total area of the device 30, is relatively small.) Having small mirrors is undesirable because they cannot intercept as much of an optical beam directed thereto, causing higher insertion losses. Alternatively, larger mirrors can be used, but with reduced packing density, which is the number of arrayed mirror devices in a given area.

The magnetic field applied to mirror devices of the type shown in FIG. 2 can be provided by magnets positioned in the plane of the mirror. As shown, e.g., in FIG. 3, a mirror device 42 includes magnets 44 in the plane of the mirror structure 32. A strong magnetic field is needed at the plane of the mirror and gimbal to reduce the current needed to deflect the mirror, and thereby reduce power consumption and heating of the mirror. The magnets 44 are accordingly relatively large. A frame 46 of soft magnetic material is often provided to intensify the field. The relatively large magnets and frame make it difficult to have multiple mirrors of this type positioned close to each other in an array thereby reducing the packing density of such arrays.

A need accordingly exists for movable mirror devices having a high mirror area fill factor, and which can be densely packed. A need also exists for a method of manufacturing such devices. A need further exists for mirror devices that can be easily and accurately controlled.

BRIEF SUMMARY OF EMBODIMENTS OF THE INVENTION

One embodiment of the invention is directed to a mirror device (for use in devices such as an optical switch, scanner or projector) having a movable mirror structure with an attached magnet. The mirror structure is movably mounted on a base structure, which includes an actuation coil for controlling movement of the mirror structure.

Another embodiment of the invention is directed to a mirror device (in a device such as an optical switch, scanner or projector) having a high mirror area fill factor. The device includes a mirror mounted on a support member, which is connected to a gimbal frame. The support member includes an enlarged portion configured to at least partially extend over the gimbal frame. The mirror substantially covers the enlarged portion of the support member, thereby providing the device with a high mirror area fill factor.

A further embodiment of the invention is directed to a mirror support structure for a movable mirror device (in a device such as an optical switch, scanner or projector). The mirror support structure includes a post member and an enlarged lid member, one of which includes a plurality of holes and the other of which includes a corresponding plurality of projections. The post and lid members are assembled by positioning the projections in the corresponding holes.

These and other features of various embodiments of the present invention will become readily apparent from the following detailed description wherein embodiments of the invention are shown and described by way of illustration of the best mode. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

A first embodiment of the invention is directed to an electromagnetically actuated mirror device having a movable mirror structure with an attached permanent magnet. The mirror structure is pivotally mounted on a base structure, which includes one or more actuation coils for applying a magnetic field that induces force on the mirror structure, thereby causing selective mirror movement.

Figure 4:
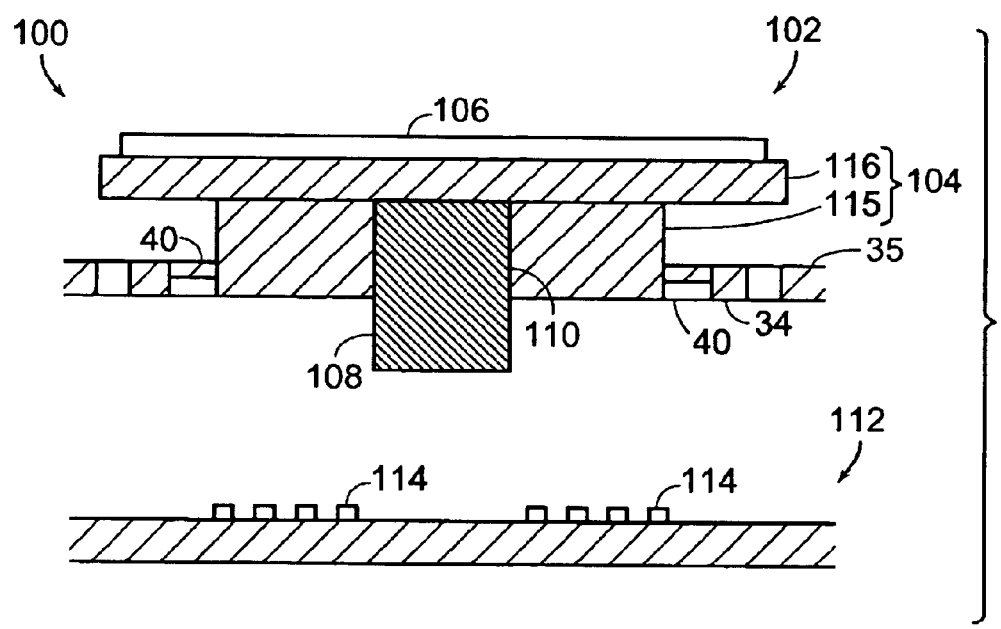
FIG. 4 is a cross-sectional view schematic diagram of a mirror device in accordance with one embodiment of the invention.

FIG. 4 is a cross-sectional view of an example of a mirror structure and base structure assembly 100 in accordance with this embodiment. The mirror structure 102 includes a member 104 with a mirror 106 having an exposed reflective surface thereon. A permanent magnet 108 is affixed to the member 104. In this example, the magnet 108 is mounted in a hole 110 in the member 104.

Figure 1:
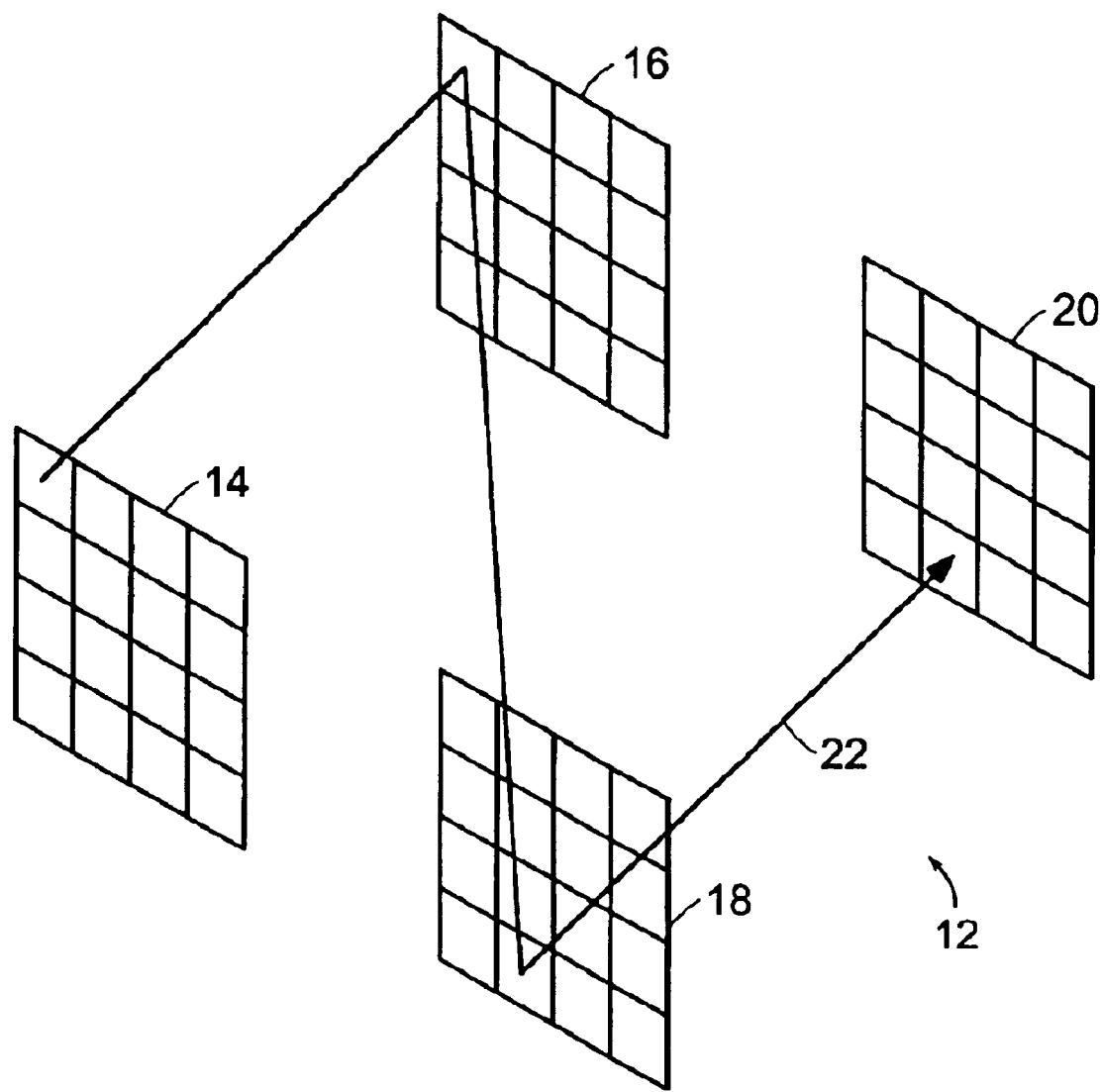
FIG. 1 is a schematic illustration of an example of an optical cross-connect.
Figure 2A:
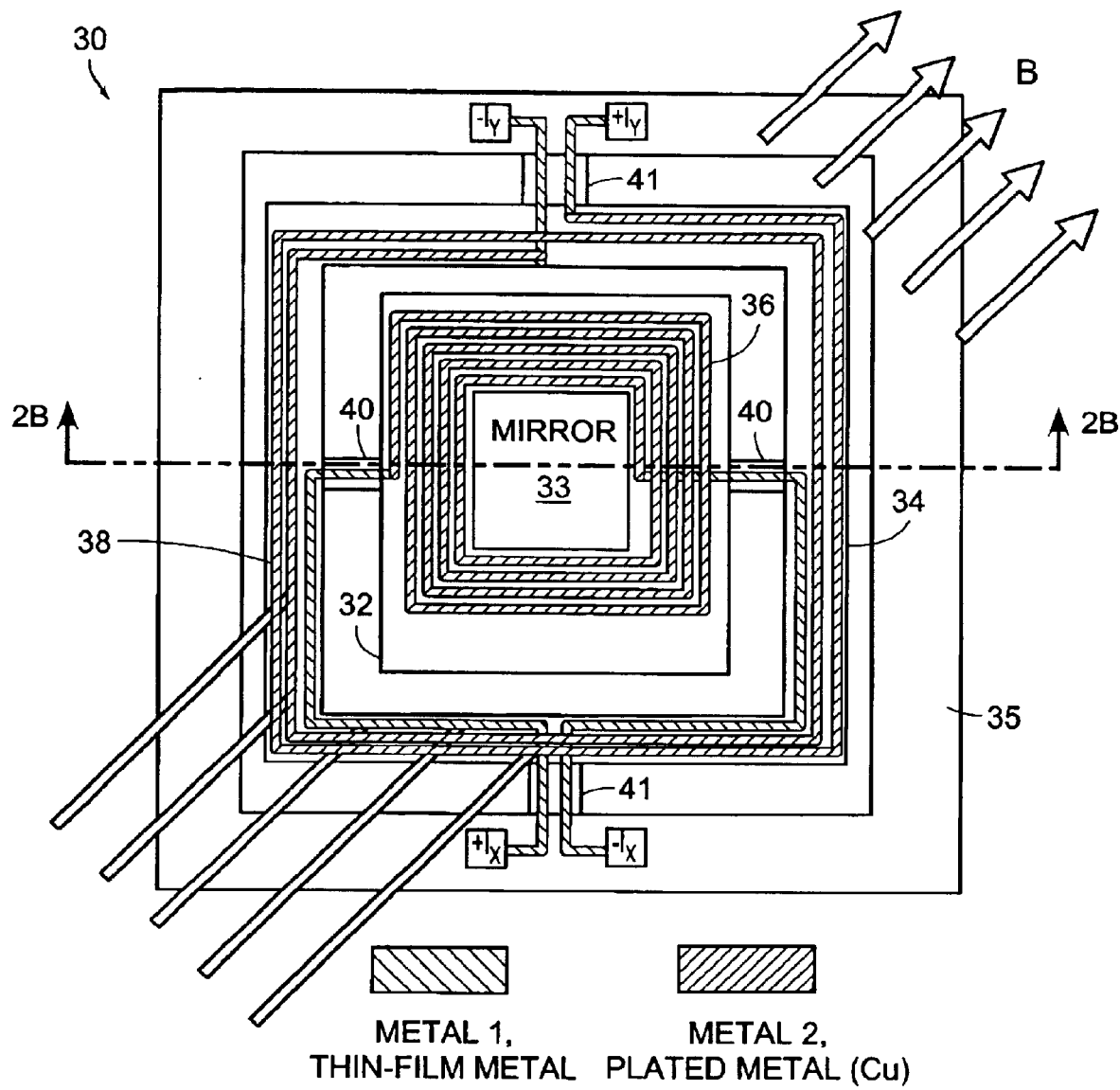
FIG. 2A is a plan view schematic diagram of a mirror device in accordance with the prior art.
Figure 2B:
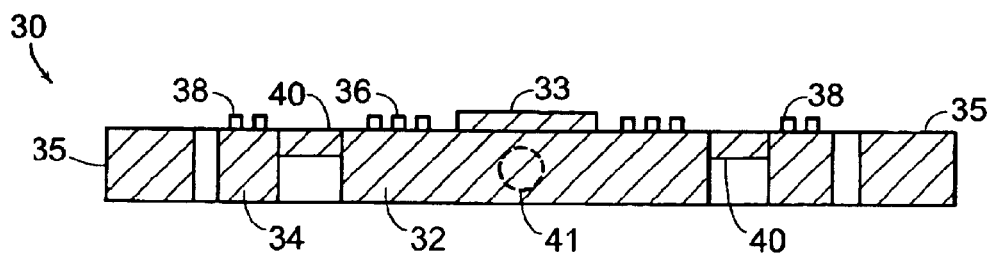
FIG. 2B is a cross-sectional view of the FIG. 2A device.

The mirror structure 102 is pivotally mounted to the base structure 112 preferably using a gimbal mechanism like, e.g., the mechanism shown in FIG. 2, which comprises inner and outer frames 34, 35 and inner and outer flexures 40, 41.

The outer frame 35 is fixed relative to the base structure. The base structure 112 includes a substrate or wafer with one or more actuation coils 114 thereon for creating a magnetic field.

The member 104 shown in FIG. 4 preferably includes a post 115 and a widened or enlarged lid 116 on the post. As will be discussed below, the widened lid 116 allows larger mirrors to be used. The post 115 raises the mirror 106 relative to the gimbal mechanism and allows for increased angles of rotation. The member 104 is preferably formed from of a single wafer or substrate or alternatively from multiple wafers or substrates. The member 104 preferably comprises silicon. Other materials are however also possible including, e.g., ceramics (such as $Al_2O_3$), metal, polymers (such as FR4 or Kapton), GaAs, SiGe, and glass.

The hole 110 in the post 115 may be formed by various processes including, e.g., anistropic etching, isotropic etching, reactive ion etching (RIE), deep reactive ion etching (DRIE), or other plasma or wet chemistry based etching processes.

The permanent magnet 108 may be fitted into the hole 110 by various methods including, e.g., automated pick and place or manual operations. The magnet 108 can be held in place by some form of adhesive such as, e.g., epoxy. Alternatively, the magnet can be bonded in the hole 110 by depositing a layer of gold on the magnet and a layer of gold in the hole, and then diffusion bonding the two gold surfaces. The gold layer on the magnet can be provided by first depositing a titanium layer on the magnet for adhesion and then depositing gold on the titanium surface. Gold layers can be deposited by various processes including, e.g., evaporation and sputtering. This process of diffusion bonding of the gold surfaces has the advantage that the mirror assembly will not contain polymers, which might outgas during the life of the product. Alternatively, layers of gold and silicon or tin can be eutectically bonded to adhere the magnet.

The magnet 108 should be oriented in some particular direction of magnetization in the hole 110. The magnet 108 can be rotated into proper alignment in the hole 110 by adding a very thin layer of soft magnetic material to the bottom of the hole and positioning a second larger permanent orientation magnet (or group of magnets) behind the mirror structure oriented in some desired particular direction, e.g., S-N. The magnet placed in the hole will move to have its south pole near the north pole of the larger second magnet and vice-versa. This method of magnet alignment would allow for the magnets to easily self-align in the holes of multiple mirror devices in an array all in same desired orientation of north and south poles.

The sidewalls of the hole may be sloped to allow the magnet to more readily self-align in the hole. Sloped sidewalls would allow for the magnet to rotate into the desired orientation. The sidewalls may be made sloped using various processes including, e.g., a KOH or other anisotropic etch on a <100> wafer.

The mirror 106 itself could be evaporated, sputtered or otherwise deposited and patterned on the surface of the lid 116. The mirror can also be placed on the lid and secured with, e.g., an adhesive or eutectic bond.

One advantage of having magnets, but not actuation coils, on movable mirror structures is that there is a reduced chance of heat damage from the actuation coils. Moving the actuation coils and heat generated therefrom away from the mirror reduces thermal cycling and the risk of mirror warping.

A possible problem in assembling magnets in post holes may be breakage or cracking of the lids from forces from the magnets impacting the lids during assembly. One way to avoid this problem would be to have a layer of polymer or other elastic material (such as, e.g., rubber or foam) placed between the lid 116 and the post 115 to aid in absorbing the mechanical force of the magnets striking the lid.

Another way of reducing the risk of damage to the lid 116 would be to place some epoxy or other material having sufficient viscosity in the post hole 110. This material would act to absorb the force of the magnet as it is placed in the hole.

Yet another way to reduce the impact forces on the lid 116 would be to assemble the magnet in the hole in a non-ferrous fluid such as, e.g., water. As the magnet approaches the bottom of the post hole, the water will act to slow the motion of the magnet into the hole.

Figure 5:
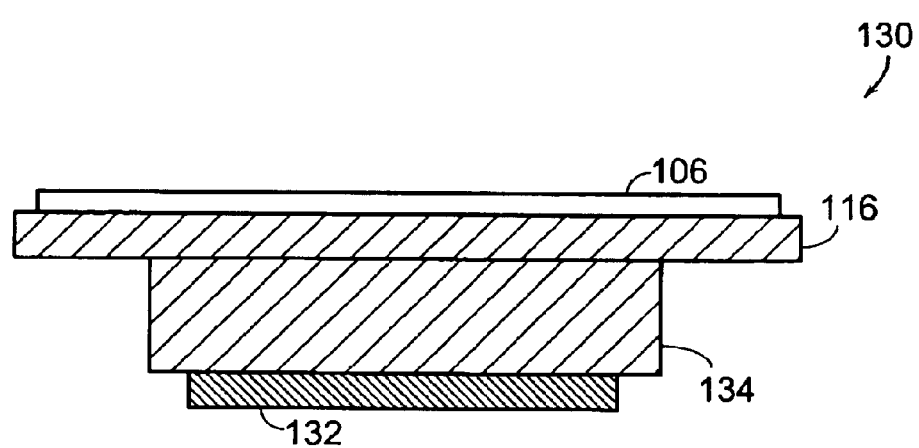
FIG. 5 is a cross-sectional view schematic diagram of a movable mirror structure in accordance with another embodiment of the invention.

Other configurations of mirror structures with magnets are also possible. For example, FIG. 5 illustrates a movable mirror structure 130 in which magnetic material 132 is deposited on the back surface of the post 134. The magnetic material can be deposited on the post in a variety of ways. For example, a permanent magnet paste or mixture can be screen or stencil printed on the post surface. The magnet paste can also be deposited by automatic or manual dispense equipment such as, e.g., equipment ordinarily used to dispense epoxy for a semiconductor die attach operation.

One way to make a magnet paste that can be deposited on the post would be to mix a magnetic powder or particles (e.g., strontium ferrite or samarium cobalt) in a polymer binder such as, e.g., polyimide or epoxy. This material can then be printed or otherwise deposited on the member and then cured. In order to improve the magnetic performance of such magnets, a magnetic field may be applied in the direction of the preferred magnetization during the polymer curing process.

Another method of attaching a permanent magnet to the silicon member would be to apply a magnetic tape (made of materials such as, e.g., strontium ferrite, samarium cobalt, and neodymium iron boron) having an adhesive on at least one side. Such magnetic tapes are commercially available and can be applied by affixing an adhesive portion of the tape to the member.

Figure 6:
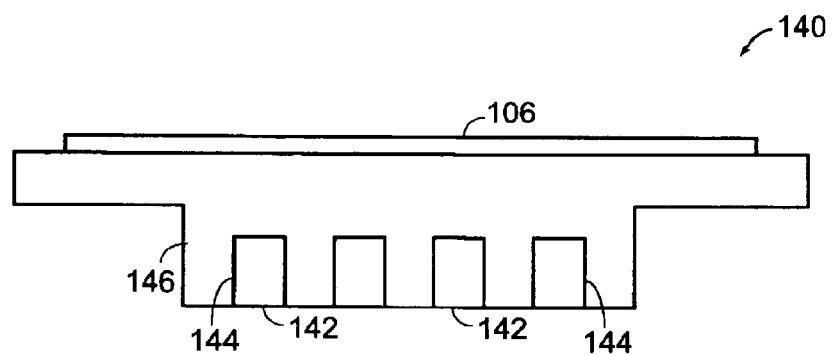
FIG. 6 is a cross-sectional view schematic diagram of a movable mirror structure in accordance with another embodiment of the invention.

Other arrangements of magnets in movable mirror structures are also possible. For example, in accordance with another embodiment of the invention as illustrated in the example mirror structure 140 shown in FIG. 6, permanent magnet material 142 is placed in one or more trenches or holes 144 in the bottom of the post 146. This configuration has the advantage that the mass of the magnet is positioned closer to a rotational axis, which reduces the sensitivity of the design to vibration. This structure can be fabricated, e.g., by using a silicon wafer and patterning the holes for the magnet on the backside of the wafer and then etching the deep grooves that form the post providing height to the member. The mirror 106 may then be deposited on the front of the wafer (i.e., on the lid) by sputtering or evaporation, or other methods as previously discussed.

To fabricate the grooves in a single step, a KOH etch could, e.g., be employed. The holes can be created in such a manner for the permanent magnet holes to stop at a predetermined depth by the formation of a v-groove in <100> surface orientation silicon wafer. By using a different silicon material, the shape of the v-groove could be made more rectangular, e.g., by using a <110> surface orientation wafer instead of a <100> wafer. Another method of making a one step silicon post and lid formation could be to use a doped silicon wafer or substrate, or a silicon on insulator substrate.

Other magnet/mirror structure configurations and methods of placing permanent magnets on mirror members are also possible and would be apparent to one skilled in that art.

The configuration of the member supporting the mirror comprising the widened lid and the underlying post allows for use of larger mirrors and makes possible larger angles of mirror deflection. As shown in FIG. 4, the lid 116 is wider than the underlying post 115 and extends at least partially over the gimbal mechanism around the post. The mirror 106 extends substantially over the entire surface of the lid 116 and accordingly is significantly larger than mirrors in prior art devices. The mirror device is therefore able to have a high mirror area fill factor. Area fill factors of about 80% or higher (e.g., about 95%) can be achieved in devices in accordance with the invention. Also, the post 115 is sufficiently high to raise the lid 116 relative to the gimbal frame 34, 36 to allow for an increased angle of rotation or deflection without the lid contacting the gimbal mechanism.

Figure 7:
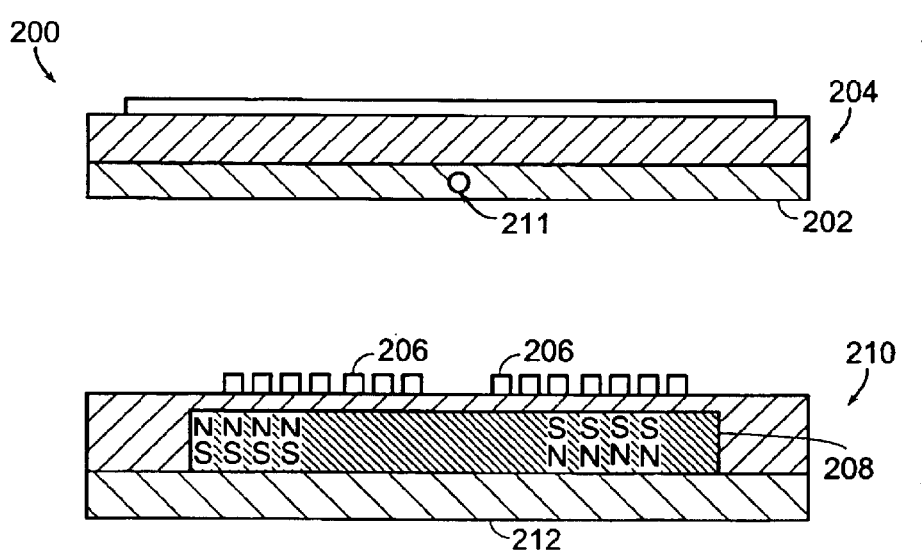
FIG. 7 is a cross-sectional view schematic diagram of a mirror device in accordance with another embodiment of the invention.

As shown in FIG. 7, in accordance with another embodiment of the invention, a mirror device 200 is provided in which a soft magnetic material 202 is provided on the movable mirror structure 204. One or more actuation coils 206 and a permanent magnet 208 are provided on a base structure 210 or in the device packaging or housing. (The mirror structure 204 is pivotally supported on the base structure 204 for rotation about a rotational axis 211 provided by a gimbal flexure.) The permanent magnet 208 produces a flux that flows through the soft magnetic material 202 (e.g., nickel or nickel-iron) on the bottom of the movable mirror structure 204. A second layer of soft magnetic material 212 can optionally be provided under the permanent magnet 208 in the base structure 210 to help contain the magnetic flux and reduce the reluctance of the flux path. The permanent magnet 208 is magnetized such that one portion is magnetized with a south pole on top and a north pole on the bottom, and another portion is magnetized with a north pole on top and a south pole on the bottom. This configuration could be achieved in the same magnet or with separate magnets each magnetized in the desired orientation. Other magnet configurations are also possible as shown, e.g., below with respect to FIG. 8.

The coil 206 on the base structure 210 produces a magnetic flux, which also flows through the soft magnetic material 202. (It should be understood that more than one coil can be used as multiple coil paths could be defined.) The coil 206 produces a magnetic flux that aids or reduces the magnetic flux from the permanent magnet 208. For example, the coil 206 can be designed so that on one side of the rotational axis 211, the magnetic flux generated by the coil 206 adds to the magnetic flux from the permanent magnet 208, and on the other side of the rotational axis 211, the magnetic flux generated by the coil 206 subtracts from the magnetic flux of the permanent magnet 208. This produces different forces on each side of the rotational axis 211 of the mirror structure, resulting in a rotation of the mirror structure 204 toward the side with the greater magnetic flux. This effect can be extended to dual axis rotation by having a second magnet and coil geometry orthogonal to the first one. This would then allow for dual axis scanning or control of the mirror.

Figure 8:
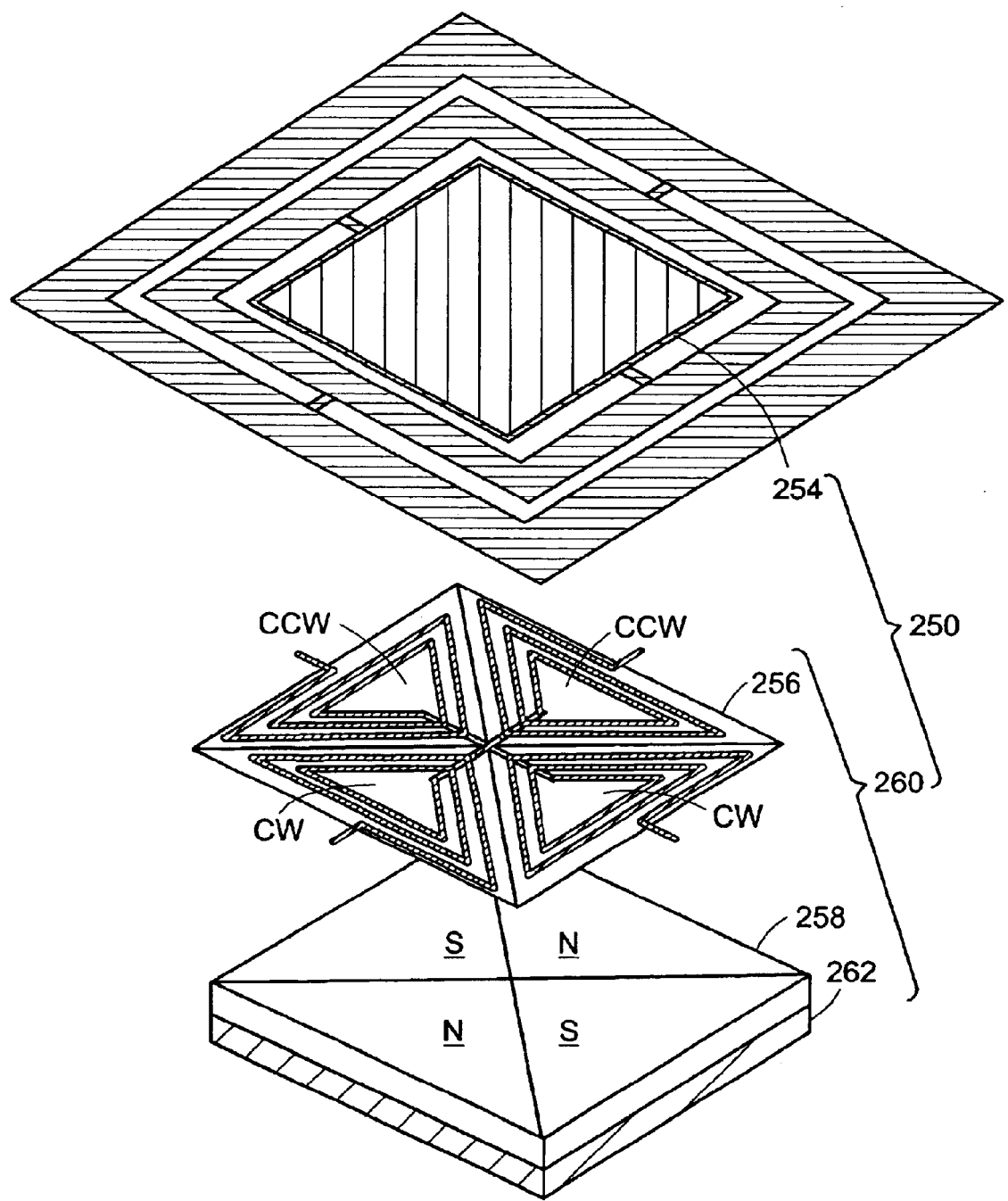
FIG. 8 is an exploded view schematic diagram of a mirror device in accordance with another embodiment of the invention.
Figure 9:
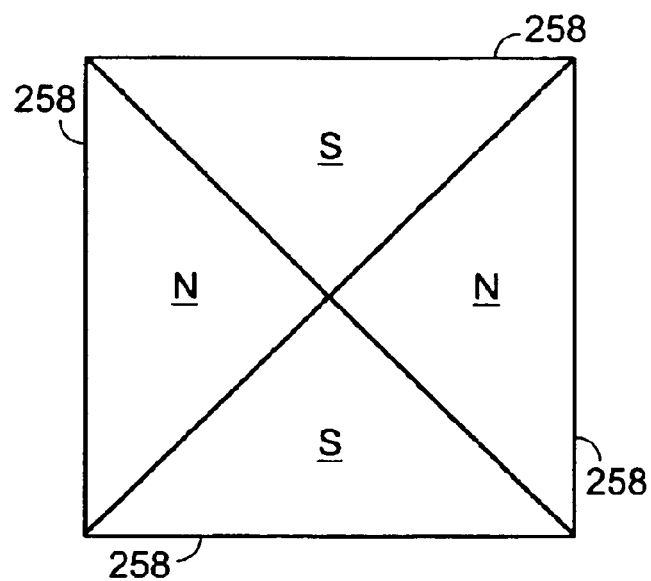
FIG. 9 is a plan view schematic diagram of the magnet arrangement shown in FIG. 8.
Figure 10:
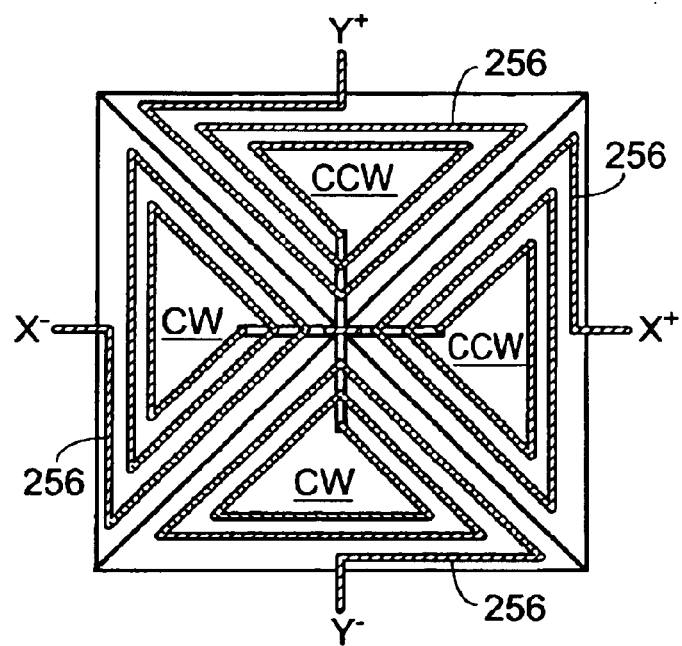
FIG. 10 is a plan view schematic diagram of the coil layout shown in FIG. 8.

FIGS. 8–11 illustrate an example of a mirror device 250 similar in some respects to the mirror device 200 of FIG. 7. FIG. 8 is an exploded view of mirror device 250. The mirror device 250 includes a mirror structure 254 movably supported on a base structure 260. Four actuation coils 256 and four permanent magnets 258 are provided in the base structure 260. The base structure 260 includes a soft iron base 262 with an arrangement of the four magnets 258 thereon. The actuation coils 256 are positioned on the four magnets 258. Top plan views of the magnets and coils are shown in FIGS. 9 and 10, respectively.

Figure 11:
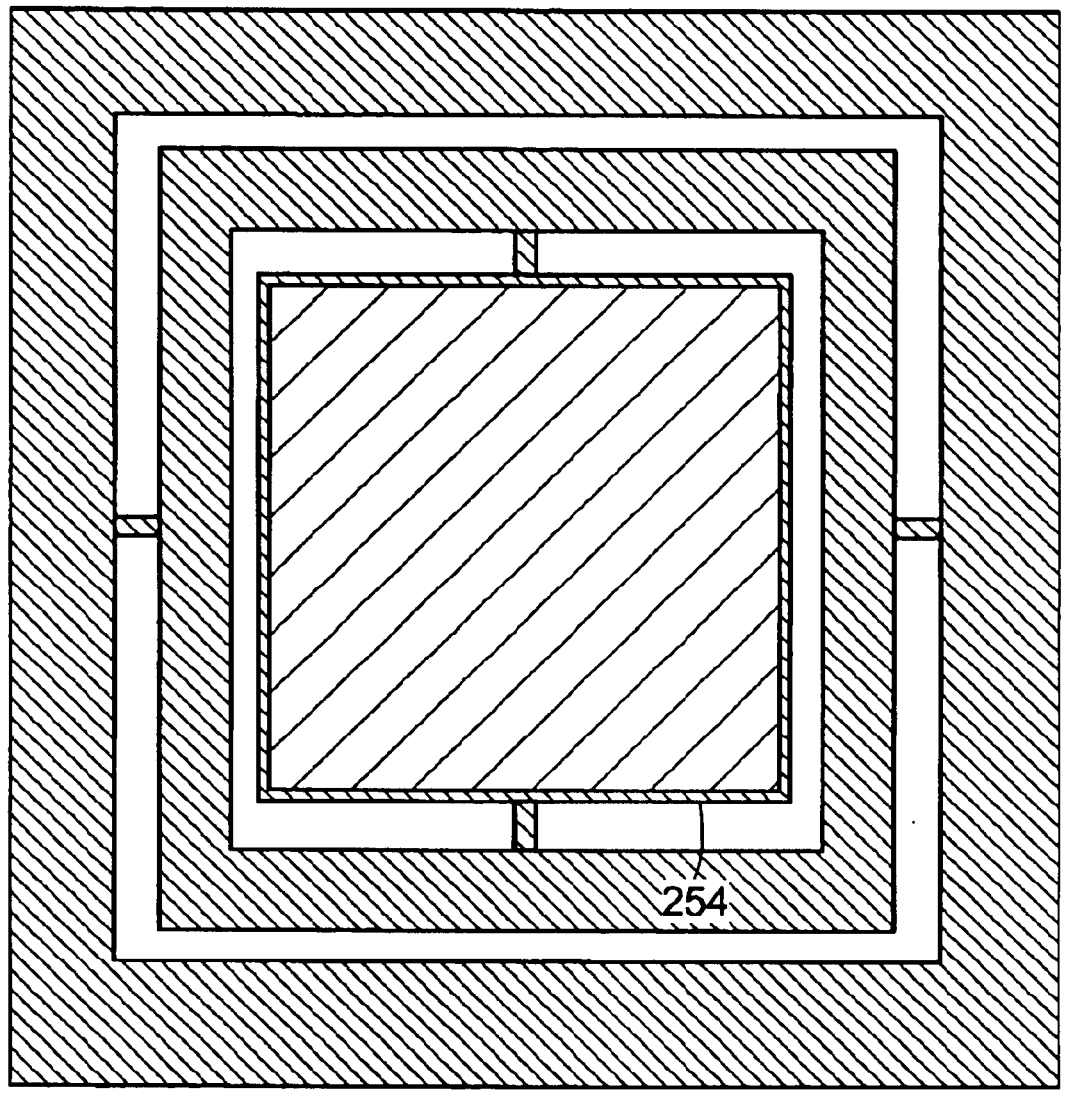
FIG. 11 is a plan view schematic diagram of the mirror structure shown in FIG. 8.

The mirror structure and gimbal assembly is positioned above the base structure 260 and is also shown in the plan view of FIG. 11. A soft magnetic film can be deposited on the mirror structure 254 on a side thereof facing the base structure 260.

The magnet layout shown in FIG. 9 can be formed, e.g., from a monolithic body of hard magnetic material or from a polymer filled with hard magnetic powder. The local magnetization can be provided in various ways including, e.g., by spot poling. Spot poling involves applying a local, very strong magnetic field sufficient to locally reverse the direction of polarization. In the case of a polymer filled with magnetic particles, the particles can re-orient if the polymer is soft, as during spin casting, screen printing, or heating, in the presence of an external magnetic field.

It should be understood that mirror devices in accordance with other embodiments of the invention can include other arrangements of multiple coil levels and/or multiple magnets or magnet assemblies. In addition, it is possible to place coils under only one side of the rotational axis, thereby introducing a magnetic flux change on only one part of the mirror assembly. The magnets or the coils, or the magnets and the coils, can also be placed or fabricated in the package or housing of the mirror device. Those skilled in the art will also recognize that the position of the coils and magnets may be changed to include various other configurations including, e.g., the permanent magnet on the movable mirror structure, the coil on the movable mirror structure, the coil and permanent magnet on the movable mirror structure, and additional soft magnetic material to define the flux path and to concentrate the magnetic flux.

The axis of rotation need not be centered as shown in FIG. 7. The axis of rotation may be moved to allow for different mechanical properties to be realized. For example, it may be advantageous to have the coil on one side of the rotational axis and to shift the rotational axis off center so that the mirror structure could act like a cantilever beam when the coil has current passing through it.

Figure 3:
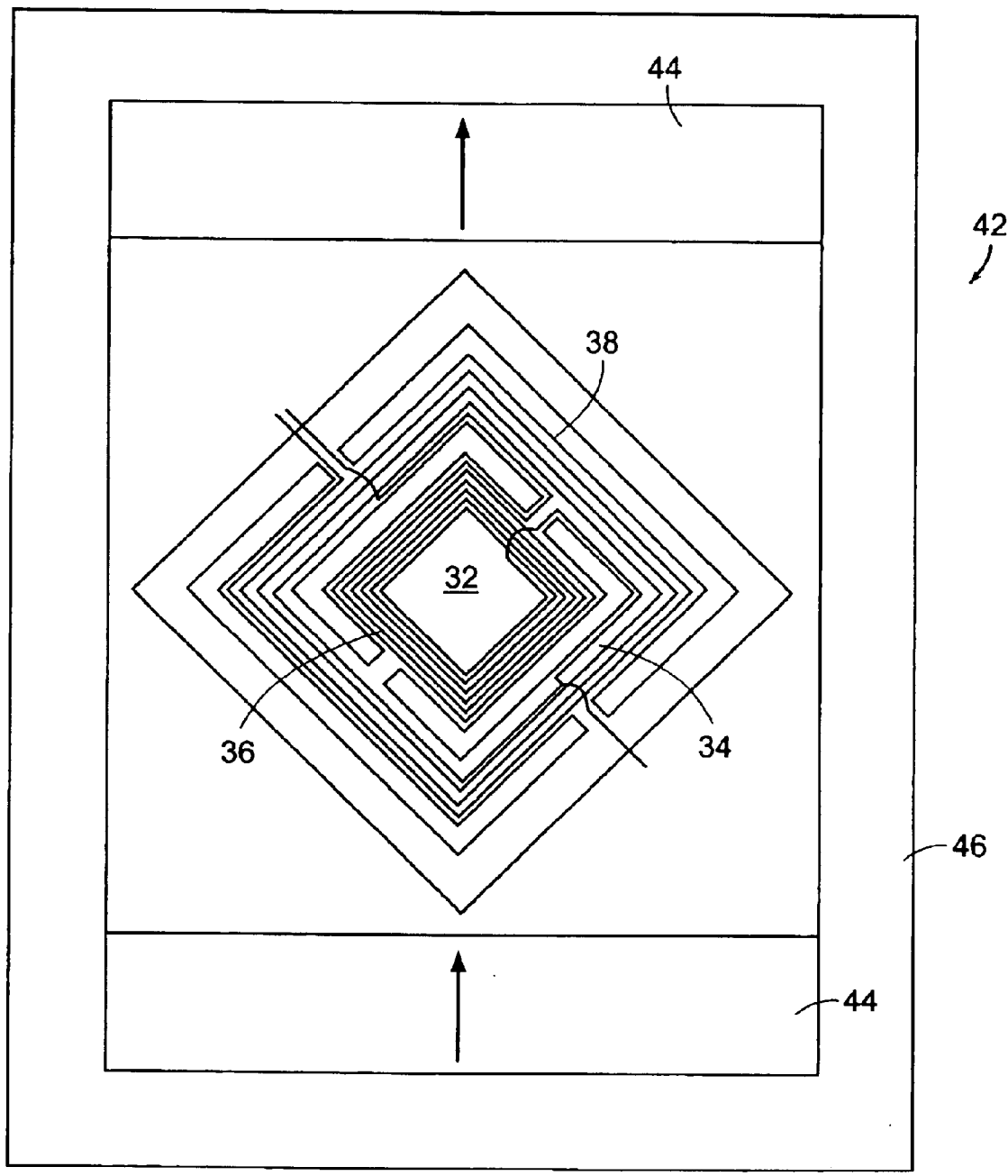
FIG. 3 is a plan view schematic diagram of a mirror device with magnets in the plane of the mirror in accordance with the prior art.
Figure 12:
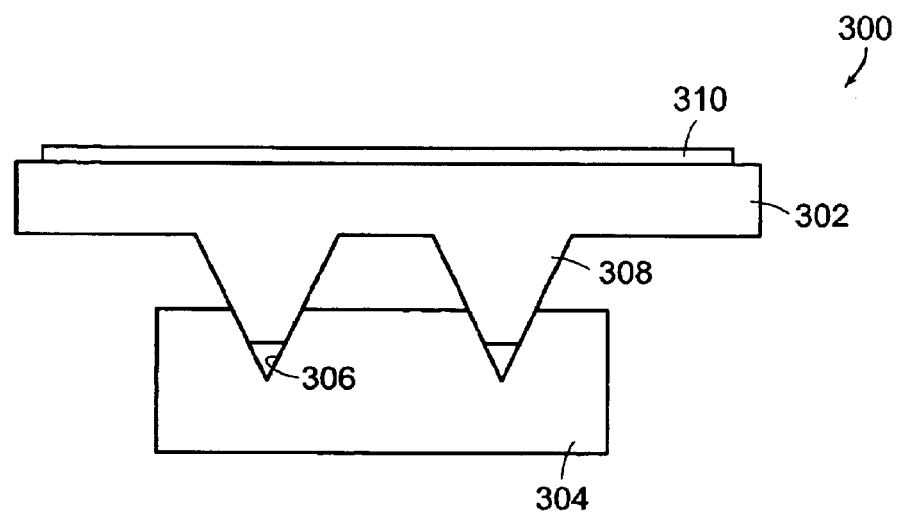
FIG. 12 is a side view schematic diagram of a mirror support structure in an assembled state in accordance with another embodiment of the invention.

Another embodiment of the invention is directed to a mirror support structure for a movable mirror device that can be actuated by a variety of actuation mechanisms not limited to electromagnetic actuation. The support structure 300 generally comprises a lid member 302 assembled with a post member 304 as shown, e.g., in FIGS. 12 and 13. FIGS. 12 and 3 show the support structure in assembled and unassembled states, respectively. In general, a groove or hole 306, or multiple grooves or holes are etched in one of the post and lid members. Projections 308 such as inverted grooves or pyramid structures are etched on the other of the post and lid members. The post and lid members preferably comprise silicon, though use of other material is also possible. The lid member has a sufficiently flat surface for placement or deposition of a mirror 310 on a side thereof opposite the post member 304.

One advantage of the support structure 300 is that it is self aligning such that the mirror can be aligned in both the X and Y axes as well as with respect to the height and angle of the mirror. This allows the mirror to be very flat, i.e., untilted, and accurately positioned.

In certain cases it may be advantageous to produce a tilted mirror. Accordingly, the grooves or projection heights may be selectively adjusted to have one side of the mirror higher than another. For example, one KOH etch trench could be slightly wider, which would result in a deeper trench during the etch process. The corresponding projection would be positioned deeper in the trench, resulting in a structure with one side of the mirror higher than the other.

Figure 14:
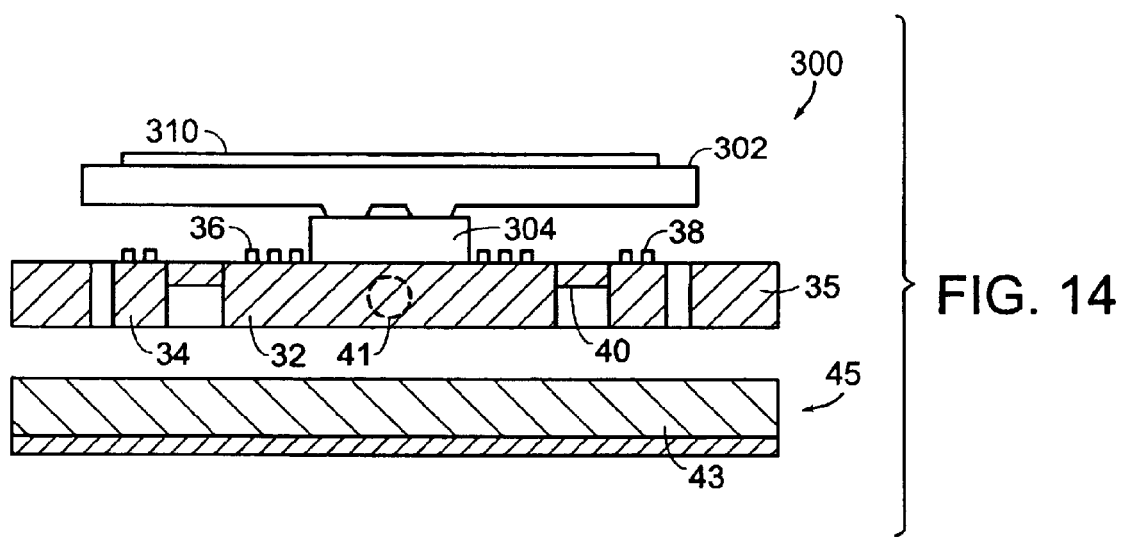
FIG. 14 is a cross-sectional view schematic diagram of a mirror device including a mirror support structure in accordance with an embodiment of the invention.

After assembly, the mirror support structure can be positioned on a movable substrate in a mirror device. As shown, e.g., in FIG. 14, the mirror support structure 300 is positioned on a movable substrate 32 in place of a simple mirror as in the prior art mirror device shown in FIG. 2B. The use of the mirror support structure 300 has several advantages over simply placing the mirror on the movable substrate. The lid member of the support structure is wide and allows use of larger mirrors, thereby increasing the mirror fill factor. Also, the post member provides sufficient height to the lid member such that the angle of rotation can be increased without the lid member touching other surrounding parts of the device.

Figure 13:
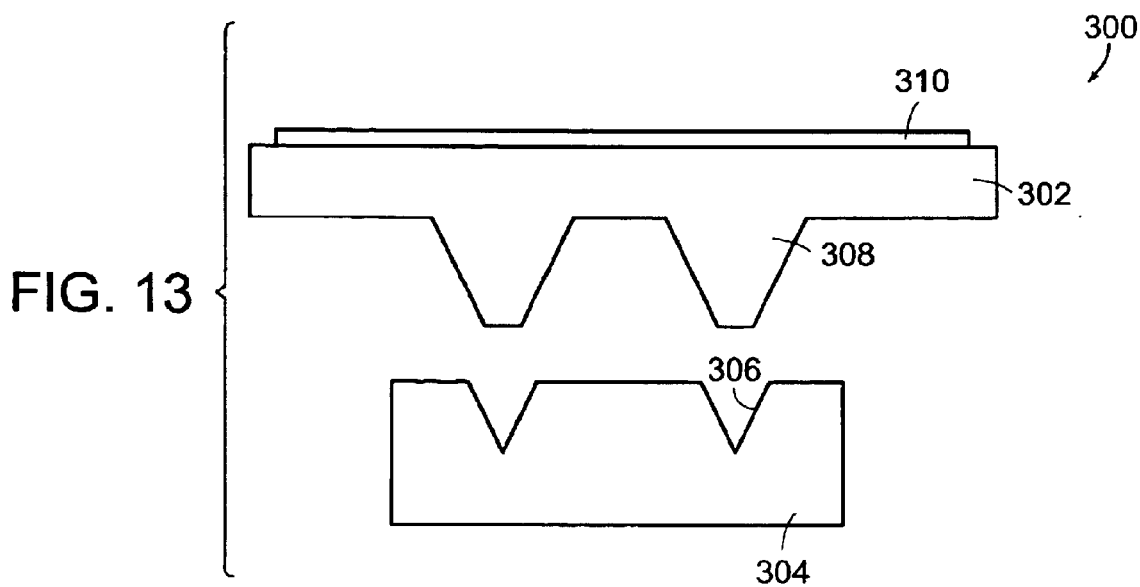
FIG. 13 is a side view schematic diagram of the mirror support structure of FIG. 12 in an unassembled state.

It should be noted that many variations of the mirror support structure could be produced. These variations include, e.g., a structure with a solid post or a group of posts. Also, the position of the projections and holes could also be reversed from what is shown in FIGS. 12 and 13. Namely, the holes for alignment can be on the lid member and the projections on the post member. Alternatively, each of the post and lid members can include both one or more holes and one or more projections, with the hole or holes on one member corresponding to the projection or projections on the other member. As a further alternative, the post could be eliminated, and the lid member could be connected directly to the substrate using sufficiently long projections.

Figure 15:
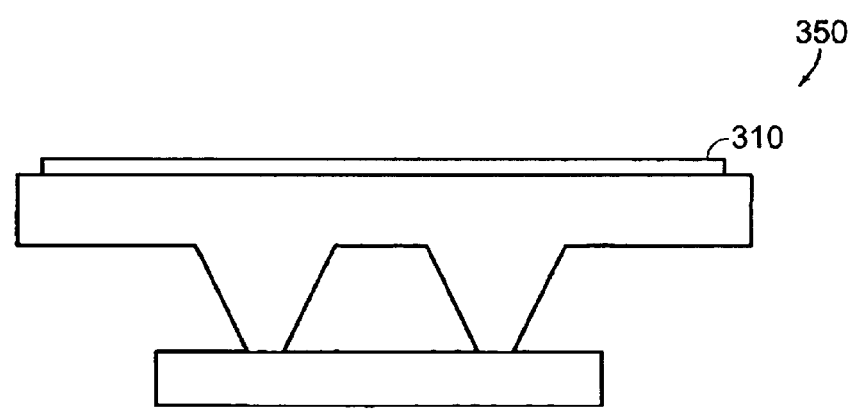
FIG. 15 is a side view schematic diagram of another mirror support structure in accordance with an embodiment of the invention.

It should be noted that the use of projections and holes is not essential for assembly. For example, the post member and the lid member could be assembled by a variety of methods including, e.g., anodic bonding, epoxy attachment, and eutectic bonding. The post and lid members may also be integrally formed as shown, e.g., in the mirror support structure 350 of FIG. 15.

While the various mirror devices and structures described above are particularly suitable for use in optical switches, it should be noted that they can also be used in various other devices including, e.g., scanners and projectors.

Having described various preferred embodiments of the present invention, it should be apparent that modifications can be made without departing from the spirit and scope of the invention.

What is claimed is:

1. A mirror assembly, comprising:
   a base structure having an actuation coil; and
   a mirror structure movably mounted on said base structure, said mirror structure including a member having an exposed reflective surface and a magnet affixed to said member.

2. The mirror assembly of claim 1 wherein said magnet comprises a magnet layer on a surface of said member opposite said reflective surface.

3. The mirror assembly of claim 1 wherein said magnet has a generally planar shape.

4. The mirror assembly of claim 1 wherein said magnet is screen printed on a surface of said member opposite said reflective surface.

5. The mirror assembly of claim 1 wherein said magnet comprises a magnet tape bonded to a surface of said member opposite said reflective surface.

6. The mirror assembly of claim 1 wherein said magnet is mounted in a hole in said member.

7. The mirror assembly of claim 6 wherein said hole is generally centrally located in said member.

8. The mirror assembly of claim 1 wherein said magnet is recessed in said member.

9. The mirror assembly of claim 1 wherein said magnet includes portions poled in different directions.

10. The mirror assembly of claim 9 wherein said portions of said magnet are spot poled.

11. The mirror assembly of claim 1 wherein a plurality of magnets are mounted in a plurality of holes in said member.

12. The mirror assembly of claim 11 wherein said holes comprise trenches extending along said member.

13. The mirror assembly of claim 1 wherein said member includes a post between said reflective surface and said magnet.

14. The mirror assembly of claim 13 wherein said post comprises a material selected from a group consisting of silicon, ceramics, metal, polymer, GaAs, SiGe and glass.

15. The mirror assembly of claim 1 wherein said member comprises silicon.

16. The mirror assembly of claim 1 wherein said reflective surface comprises a material selected from a group consisting of Au, Ag, Pt, Al, Pd and Ir.

17. The mirror assembly of claim 1 wherein said actuation coil comprises a material selected from a group consisting of copper, gold, aluminum, platinum, silver, tungsten, molybdenum and iridium.

18. The mirror assembly of claim 1 further comprising a gimbal frame pivotally supporting said mirror structure on said base structure wherein the reflective surface at least partially extends over said gimbal frame to increase mirror area fill factor.

19. The mirror assembly of claim 1 wherein a support structure pivotally supports said mirror structure on said base structure, and wherein said reflective surface at least partially extends over said support structure to increase mirror area fill factor.

20. The mirror assembly of claim 1 wherein a support structure pivotally supports said mirror structure on said base structure, and wherein the reflective surface is sufficiently large to substantially cover said support structure.

21. The mirror assembly of claim 1 wherein the mirror structure further comprises material between said member and said magnet to absorb impact forces from installation of said magnet.

22. The mirror assembly of claim 1 wherein said mirror assembly is usable in an optical switch, scanner or projector.

23. An array of mirror assemblies for an optical switch, scanner or projector, each mirror assembly comprising:
   a base structure having an actuation coil; and
   a mirror structure movably mounted on said base structure, said mirror structure including a member having an exposed reflective surface and a magnet affixed to said member.

24. The array of mirror assemblies of claim 23 wherein said magnet comprises a magnet layer on a surface of said member opposite said reflective surface.

25. The array of mirror assemblies of claim 23 wherein said magnet has a generally planar shape.

26. The array of mirror assemblies of claim 23 wherein said magnet is screen printed on a surface of said member opposite said reflective surface.

27. The array of mirror assemblies of claim 23 wherein said magnet comprises a magnet tape bonded to a surface of said member opposite said reflective surface.

28. The array of mirror assemblies of claim 23 wherein said magnet is mounted in a hole in said member.

29. The array of mirror assemblies of claim 28 wherein said hole is generally centrally located in said member.

30. The array of mirror assemblies of claim 23 wherein said magnet is recessed in said member.

31. The array of mirror assemblies of claim 23 wherein a plurality of magnets are mounted in a plurality of holes in said member.

32. The array of mirror assemblies of claim 31 wherein said holes comprise trenches extending along said member.

33. The array of mirror assemblies of claim 23 wherein said magnet includes portions poled in different directions.

34. The array of mirror assemblies of claim 33 wherein said magnet is spot poled.

35. The array of mirror assemblies of claim 23 wherein said member includes a post between said reflective surface and said magnet.

36. The array of mirror assemblies of claim 35 wherein said post comprises a material selected from a group consisting of silicon, ceramics, metal, polymer, GaAs, SiGe and glass.

37. The array of mirror assemblies of claim 23 wherein said member comprises silicon.

38. The array of mirror assemblies of claim 23 wherein said reflective surface comprises a material selected from a group consisting of Au, Ag, Pt, Al, Pd and Ir.

39. The array of mirror assemblies of claim 23 wherein said actuation coil comprises a material selected from a group consisting of copper, gold, aluminum, platinum, silver, tungsten, molybdenum and iridium.

40. The array of mirror assemblies of claim 23 further comprising a gimbal frame pivotally supporting said mirror structure on said base structure wherein the reflective surface at least partially extends over said gimbal frame to increase mirror area fill factor.

41. The array of mirror assemblies of claim 23 wherein a support mechanism pivotally supports said mirror structure on said base structure, and wherein said reflective surface at least partially extends over said support mechanism to increase mirror area fill factor.

42. The array of mirror assemblies of claim 23 wherein a support mechanism pivotally supports said mirror structure on said base structure, and wherein the reflective surface is sufficiently large to substantially cover said support mechanism.

43. The array of mirror assemblies of claim 23 wherein the mirror structure further comprises material between said member and said magnet to absorb mechanical forces from installation of said magnet.

44. A method of manufacturing a mirror assembly for an optical switch, scanner or projector, comprising:
   providing an actuation coil on a base structure;
   providing a mirror structure including a member having an exposed reflective surface and a magnet affixed to said member; and
   movably mounting said mirror structure on said base structure.

45. The method of claim 44 wherein providing a mirror structure comprises forming a hole in said member and placing said magnet in said hole.

46. The method of claim 45 wherein forming a hole comprises etching said hole.

47. The method of claim 44 wherein providing a mirror structure comprises bonding the magnet to said member.

48. The method of claim 44 wherein providing a mirror structure comprises attaching a magnetic tape to said member.

49. The method of claim 44 wherein providing a mirror structure comprises screen printing a magnetic paste to said member.

50. The method of claim 49 wherein said magnetic paste comprises a powdered magnetic material in a carrier.

51. The method of claim 44 wherein providing a mirror structure comprises:
    forming holes in said member;
    placing magnetic material in said holes; and
    magnetizing said magnetic material, whereby said magnetic material comprises said magnet.

52. The method of claim 44 wherein said magnet includes portions poled in different directions.

53. The method of claim 52 wherein said magnet is spot poled.

54. A mirror assembly, comprising:
    a base structure having a magnet and an actuation coil; and
    a mirror structure movably mounted on said base structure, said mirror structure having an exposed reflective surface and a magnetic material.

55. The mirror assembly of claim 54 wherein said magnetic material is on a side of said mirror structure facing said base structure.

56. The mirror assembly of claim 55 wherein said reflective surface is on a side of said mirror structure opposite said magnetic material.

57. The mirror assembly of claim 54 wherein said base structure further includes a soft magnetic material to contain flux from said magnet.

58. The mirror assembly of claim 54 wherein said mirror structure pivots about an axis relative to said base structure, and wherein said actuation coil is laterally offset from said axis.

59. The mirror assembly of claim 54 wherein said magnetic material comprises iron.

60. The mirror assembly of claim 54 wherein said magnetic material comprises an iron nickel alloy or an iron cobalt alloy.

61. The mirror assembly of claim 54 wherein said magnetic material comprises soft magnetic material.

62. The mirror assembly of claim 54 wherein said magnetic material comprises hard magnetic material.

63. The mirror assembly of claim 54 wherein said actuation coil is on a side of said base structure facing said mirror structure.

64. The mirror assembly of claim 54 wherein said magnet includes portions poled in different directions.

65. The mirror assembly of claim 64 wherein said magnet is spot poled.

66. The mirror assembly of claim 54 wherein said mirror assembly is usable in an optical switch, scanner or projector.

67. An array of mirror assemblies for an optical switch, scanner or projector, each mirror assembly comprising:
    a base structure having a magnet and an actuation coil; and
    a mirror structure movably mounted on said base structure, said mirror structure having an exposed reflective surface and a magnetic material.

68. The array of mirror assemblies of claim 67 wherein said magnetic material is on a side of said mirror structure facing said base structure.

69. The array of mirror assemblies of claim 68 wherein said mirror is on a side of said mirror structure opposite said magnetic material.

70. The array of mirror assemblies of claim 67 wherein said base structure further comprises soft magnetic material to contain flux from said magnet.

71. The array of mirror assemblies of claim 67 wherein said mirror structure is pivotally movable about an axis relative to said base structure, and wherein said actuation coil is laterally offset from said axis.

72. The array of mirror assemblies of claim 67 wherein said magnetic material comprises iron.

73. The array of mirror assemblies of claim 67 wherein said magnetic material comprises an iron nickel alloy or an iron cobalt alloy.

74. The array of mirror assemblies of claim 67 wherein said magnetic material comprises soft magnetic material.

75. The array of mirror assemblies of claim 67 wherein said magnetic material comprises hard magnetic material.

76. The array of mirror assemblies of claim 67 wherein said actuation coil is on a side of said base structure facing said mirror structure.

77. The array of mirror assemblies of claim 67 wherein said magnet includes portions poled in different directions.

78. The array of mirror assemblies of claim 77 wherein said magnet is spot poled.

79. A mirror assembly, comprising:
    a base structure including a magnetic material; and
    a mirror structure movably mounted on said base structure, said mirror structure including an exposed reflective surface, a magnet, and an actuation coil.

80. The mirror assembly of claim 79 wherein said mirror structure further comprises magnetic material to contain flux from said magnet.

81. The mirror assembly of claim 79 wherein said mirror structure is pivotally movable about an axis, and wherein said coil is laterally offset relative to said axis.

82. The mirror assembly of claim 79 wherein said magnetic material is on a side of said base structure facing said mirror structure.

83. The mirror assembly of claim 79 wherein said reflective surface is on a side of said mirror structure opposite said actuation coils.

84. The mirror assembly of claim 79 wherein said magnetic material comprises iron.

85. The mirror assembly of claim 79 wherein said magnetic material comprises an iron nickel alloy or an iron cobalt alloy.

86. The mirror assembly of claim 79 wherein said magnetic material comprises soft magnetic material.

87. The mirror assembly of claim 79 wherein said magnetic material comprises hard magnetic material.

88. The mirror assembly of claim 79 wherein said magnet includes portions poled in different directions.

89. The mirror assembly of claim 88 wherein said portions of said magnet are spot poled.

90. The mirror assembly of claim 79 wherein said mirror assembly is usable in an optical switch, scanner or projector.

91. An array of mirror assemblies, each mirror assembly, comprising:
    a base structure including a magnetic material; and
    a mirror structure movably mounted on said base structure, said mirror structure including an exposed reflective surface, a magnet, and an actuation coil.

92. The array of mirror assemblies of claim 91 wherein said mirror structure further comprises magnetic material to contain flux from said magnet.

93. The array of mirror assemblies of claim 91 wherein said mirror structure is pivotally movable about an axis, and wherein said coil is offset relative to said axis.

94. The array of mirror assemblies of claim 91 wherein said magnetic material is on a side of said base structure facing said mirror structure.

95. The array of mirror assemblies of claim 91 wherein said reflective surface is on a side of said mirror structure opposite said actuation coils.

96. The array of mirror assemblies of claim 91 wherein said magnetic material comprises iron.

97. The array of mirror assemblies of claim 91 wherein said magnetic material comprises an iron nickel alloy or an iron cobalt alloy.

98. The array of mirror assemblies of claim 91 wherein said magnetic material comprises soft magnetic material.

99. The array of mirror assemblies of claim 91 wherein said magnetic material comprises hard magnetic material.

100. The array of mirror assemblies of claim 91 wherein said magnet includes portions poled in different directions.

101. The array of mirror assemblies of claim 100 wherein said portions of magnet are spot poled.

102. A mirror assembly, comprising:
- a base structure;
- a mirror structure having an exposed reflective surface; and
- a support structure for pivotally supporting said mirror structure for movement relative to said base structure, wherein said reflective surface extends over at least part of said support structure to increase mirror fill factor.

103. The mirror assembly of claim 102 wherein said support structure comprises a gimbal frame.

104. The mirror assembly of claim 102 wherein said reflective surface extends over substantially the entire support structure.

105. The mirror assembly of claim 102 further comprising
- an actuation coil supported by said base structure; and
- a magnet supported by said mirror structure.

106. The mirror assembly of claim 102 wherein the reflective surface includes an area at its periphery substantially covering said support structure.

107. The mirror assembly of claim 102 wherein said mirror assembly has a mirror area fill factor of at least 80%.

108. The mirror assembly of claim 102 wherein said mirror assembly has a mirror area fill factor of about 95%.

109. The mirror assembly of claim 102 wherein said assembly is usable in an optical switch, scanner or projector.

110. An array of mirror assemblies, each mirror assembly comprising:
- a base structure;
- a mirror structure having an exposed reflective surface; and
- a support structure for pivotally supporting said mirror structure for movement relative to said base structure, wherein said reflective surface extends over at least part of said support structure to increase mirror fill factor.

111. The array of mirror assemblies of claim 110 wherein said support structure comprises a gimbal frame.

112. The array of mirror assemblies of claim 110 wherein said reflective surface extends over substantially the entire support structure.

113. The array of mirror assemblies of claim 110 further comprising an actuation coil supported by said base structure, and a magnet supported by said mirror.

114. The array of mirror assemblies of claim 110 wherein said reflective surface has an area at its periphery substantially covering said support structure.

115. The array of mirror assemblies of claim 110 wherein each said mirror assembly has a mirror area fill factor of at least 80%.

116. The array of mirror assemblies of claim 110 wherein each said mirror assembly has a mirror area fill factor of about 95%.

117. The array of mirror assemblies of claim 110 wherein said assemblies are usable in an optical switch, scanner or projector.

\* \* \* \* \*